(12) United States Patent
Teodorof et al.

(10) Patent No.: US 11,117,507 B2
(45) Date of Patent: Sep. 14, 2021

(54) VEHICLE LOAD RAMP SYSTEM

(71) Applicants: Daniel Teodorof, Windsor (CA); Andrew Partin, Auburn Hills, MI (US); Bryan J Macek, Auburn Hills, MI (US); Paul A Gardiner, Amherstburg (CA); Chad J Vermeulen, Windsor (CA); Kushal Pradhan, Windsor (CA); Kyle Neighbors, Milford, MI (US); Jeffery E Long, Canton, MI (US); James B Hunter, Ypsilanti, MI (US); James J Metcalf, Plymouth, MI (US); Charles R Kaiser, Plymouth, MI (US); Jacob L Carpenter, Gaines, MI (US); Jereme A Berube, Sterling Heights, MI (US)

(72) Inventors: Daniel Teodorof, Windsor (CA); Andrew Partin, Auburn Hills, MI (US); Bryan J Macek, Auburn Hills, MI (US); Paul A Gardiner, Amherstburg (CA); Chad J Vermeulen, Windsor (CA); Kushal Pradhan, Windsor (CA); Kyle Neighbors, Milford, MI (US); Jeffery E Long, Canton, MI (US); James B Hunter, Ypsilanti, MI (US); James J Metcalf, Plymouth, MI (US); Charles R Kaiser, Plymouth, MI (US); Jacob L Carpenter, Gaines, MI (US); Jereme A Berube, Sterling Heights, MI (US)

(73) Assignee: FCA US LLC, Auburn Hills, MI (US)

(*) Notice: Subject to any disclaimer, the term of this patent is extended or adjusted under 35 U.S.C. 154(b) by 108 days.

(21) Appl. No.: 16/281,701

(22) Filed: Feb. 21, 2019

(65) Prior Publication Data

US 2020/0269742 A1    Aug. 27, 2020

(51) Int. Cl.
| | | |
|---|---|---|
| *B60P 1/43* | (2006.01) | |
| *B60P 1/64* | (2006.01) | |
| *B60P 7/08* | (2006.01) | |

(52) U.S. Cl.
CPC ............. *B60P 1/6409* (2013.01); *B60P 1/435* (2013.01); *B60P 7/0815* (2013.01); *B60Y 2200/14* (2013.01)

(58) Field of Classification Search
CPC ....... B60P 1/435; B60P 1/6409; B60P 7/0815; B60Y 2200/14
See application file for complete search history.

(56) References Cited

U.S. PATENT DOCUMENTS

| | | | |
|---|---|---|---|
| 5,133,584 A * | 7/1992 | McCleary | B62D 33/0273 296/61 |
| 5,456,511 A | 10/1995 | Webber | |

(Continued)

*Primary Examiner* — Saul Rodriguez
*Assistant Examiner* — Willie Berry, Jr.
(74) *Attorney, Agent, or Firm* — Ralph E. Smith

(57) ABSTRACT

A multi-configurable load ramp for a vehicle includes an outer ramp member, an inner ramp member pivotably coupled to the outer ramp member and movable between a deployed position extending from the outer ramp member, and a folded position where the inner ramp member is disposed nestingly within outer ramp member, and a vehicle attachment device coupled to one of the inner and outer ramp members. The vehicle attachment device includes a plate member and a hook member extending therefrom, the hook member having an upper jaw and a lower jaw at least partially defining a receiving slot to receive a portion of a tailgate. In the deployed position, one of the inner and outer ramp members is configured to couple to the tailgate via the vehicle attachment device to provide a ramp surface to load and/or unload objects from a cargo area of the vehicle.

8 Claims, 16 Drawing Sheets

(56) References Cited

U.S. PATENT DOCUMENTS

| | | |
|---|---|---|
| 5,816,638 A | 10/1998 | Pool |
| 6,227,593 B1 | 5/2001 | De Valcourt |
| 6,454,338 B1 | 9/2002 | Glickman et al. |
| 7,344,184 B2 | 3/2008 | Salvador et al. |
| 8,347,440 B1 | 1/2013 | Runyan |
| 8,827,343 B2 | 9/2014 | Peters |
| 9,067,525 B1 | 6/2015 | Ninov et al. |
| 9,162,602 B2 | 10/2015 | Wendinger et al. |
| 9,481,316 B2 | 11/2016 | Faruque et al. |
| 2009/0309381 A1 | 12/2009 | Nelson |
| 2012/0139281 A1 | 6/2012 | Cousino et al. |
| 2013/0094930 A1* | 4/2013 | Kalergis .............. B60P 1/43 414/523 |
| 2014/0064896 A1 | 3/2014 | Parmar |
| 2015/0225024 A1 | 8/2015 | Newberry |
| 2015/0375665 A1* | 12/2015 | Shaffer .............. B60P 7/08 414/537 |
| 2017/0158254 A1 | 6/2017 | Singer |

\* cited by examiner

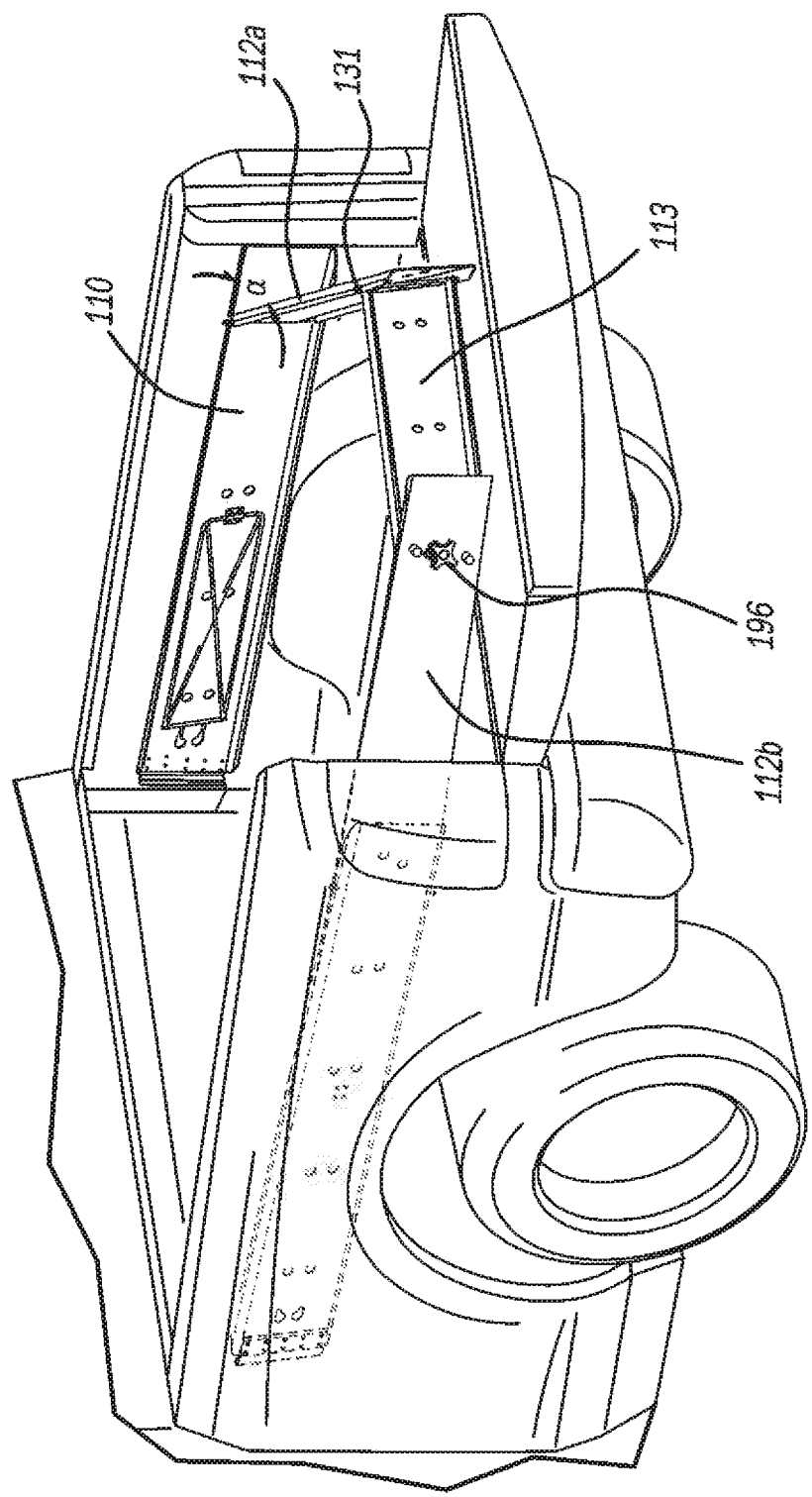

VEHICLE LOAD RAMP SYSTEM

FIELD

The present disclosure relates generally to vehicles and, more particularly, to a load ramp system for a vehicle.

BACKGROUND

Vehicles having storage beds, e.g., pickup trucks, are capable of storing and transporting large objects. Examples of these large objects include recreational vehicles such as all-terrain vehicles (ATVs) and motorcycles. These large objects are typically very heavy and are unable to be lifted into the storage bed by a single person, e.g., a driver of the vehicle. Loading ramps provide for easier loading of these large objects into the storage bed. However, some loading ramps are long and difficult to move and store. Thus, while such conventional loading ramps do work well for their intended purpose, there remains a need for improvement in the relevant art.

SUMMARY

In one example aspect a multi-configurable load ramp for a vehicle having a tailgate at least partially defining a cargo area is provided. In one example embodiment, the load ramp includes an outer ramp member, an inner ramp member pivotably coupled to the outer ramp member and movable between a deployed position extending from the outer ramp member, and a folded position where the inner ramp member is disposed nestingly within outer ramp member, and a vehicle attachment device coupled to one of the inner and outer ramp members. The vehicle attachment device is configured to removably couple to the tailgate when in an open position, wherein the vehicle attachment device includes a plate member and a hook member extending therefrom, the hook member having an upper jaw and a lower jaw at least partially defining a receiving slot to receive a portion of the tailgate. In the deployed position, one of the inner and outer ramp members is configured to couple to the tailgate via the vehicle attachment device to provide a ramp surface to load and/or unload objects from a cargo area of the vehicle.

In addition to the foregoing, the described load ramp may include one or more of the following features: a biasing mechanism configured to bias the lower jaw away from the upper jaw into an open, unclamped position such that an inner end of the lower jaw is disposed in the receiving slot, wherein when a portion of the tailgate enters the receiving slot, the tailgate portion contacts the inner end and pivots the lower jaw toward the upper jaw such that an outer end of the lower jaw is configured to clamp around the tailgate portion disposed within the receiving slot; a support arm pivotably coupled to one of the outer ramp member and the inner ramp member and configured to selectively engage the other of the outer ramp member and the inner ramp member to secure a relative positioning between the inner ramp member and the outer ramp member; and wherein in a first position the load ramp is coupled to the tailgate and the inner ramp member is secured relative to the outer ramp member with the support arm such that the load ramp is in a tabletop position that provides a tabletop surface, and wherein in a second position the load ramp is coupled to the tailgate and the inner ramp member is secured relative to the outer ramp member with the support arm such that the load ramp is in a work surface position that provides a work surface to receive at least one of a power tool and a work material.

In addition to the foregoing, the described load ramp may include one or more of the following features: wherein the load ramp is configured to couple to a wall in the cargo area and the inner ramp member is rotatable toward an opposite load ramp and coupleable thereto to establish a divided cargo area having a first cargo area and a second cargo area divided by the inner ramp member and the opposite load ramp; and wherein the load ramp is configured to couple to a wall in the cargo area and the inner ramp member is rotatable toward an opposite load ramp and coupleable thereto over the tailgate in an open position to establish an extended cargo area over the open tailgate.

In another example aspect a vehicle is provided. In one example embodiment, the vehicle includes a cargo area defined at least partially by a pair of opposed sidewalls and a tailgate movable between a closed position and an open position, a utility rail assembly coupled to one sidewall of the pair of opposed sidewalls, the utility rail assembly including a fixed pin and a sliding pin, and a load ramp having a first end and an opposite second end. The load ramp is configured to be stowed within the cargo area in a stowed position by first securing the load ramp first end to the sliding pin, sliding the load ramp into the cargo area toward a front of the vehicle by pushing the load ramp and sliding the sliding pin along the channel towards the front of the vehicle, and subsequently securing the load ramp second end to the fixed pin.

In addition to the foregoing, the described vehicle may include one or more of the following features: wherein the utility rail assembly further comprises a main body defining a channel, wherein the channel receives the fixed pin and slidingly receives the sliding pin; a ramp support bracket configured to at least partially support the load ramp when in the stowed position; and a locking member configured to selectively lock the stowed load ramp to the utility rail assembly.

In addition to the foregoing, the described vehicle may include one or more of the following features: wherein the utility rail assembly comprises a first and second utility rail assembly; wherein the first and second utility rail assemblies are coupled to opposite sidewalls; wherein the first and second utility rail assemblies are coupled to the same sidewall; a storage container having a first set of apertures to selectively receive the sliding pins of the two utility rail assemblies, and a second set of apertures to selectively receive the fixed pins of the two utility rail assemblies.

In yet another example aspect, a vehicle is provided. In one example embodiment, the vehicle includes a cargo area defined at least partially by a pair of opposed sidewalls and a tailgate movable between a closed position and an open position, a rail coupled to the tailgate and extending in a generally cross-vehicle direction, a pair of load ramps, and utility rail assemblies coupled to the opposed sidewalls.

In one example, each load ramp includes an outer ramp member, an inner ramp member, a vehicle attachment device, and a support arm.

In one example, the inner ramp member is pivotably coupled to the outer ramp member and movable between a deployed position extending from the outer ramp member, and a folded position where the inner ramp member is nestingly received within outer ramp member.

In one example, the vehicle attachment device is coupled to the outer ramp member and configured to receive the rail to thereby couple the load ramp to the tailgate. The vehicle attachment device includes a plate member and a hook member extending therefrom. The hook member has an upper jaw and a lower jaw at least partially defining a receiving slot to receive the rail, and the lower jaw is pivotally coupled to the upper jaw and is biased to an open, unclamped position by a biasing mechanism such that an inner end of the lower jaw is disposed in the receiving slot. When the rail enters the receiving slot, the rail contacts the inner end and pivots the lower jaw toward the upper jaw such that an outer end of the lower jaw is configured to clamp around the rail disposed within the receiving slot; and In one example, the support arm is pivotally coupled to one of the outer ramp member and the inner ramp member and configured to selectively engage the other of the outer ramp member and the inner ramp member to secure a relative positioning between the inner ramp member and the outer ramp member. In a first position, the load ramp is coupled to the tailgate and the inner ramp member is secured relative to the outer ramp member with the support arm such that the load ramp is in a tabletop position that provides a tabletop surface. In a second position, the load ramp is coupled to the tailgate and the inner ramp member is secured relative to the outer ramp member with the support arm such that the load ramp is in a work surface position that provides a work surface to receive at least one of a power tool and a work material.

In one example, each utility rail assembly includes a rail system having a main body defining a channel, a fixed pin disposed in one end of the channel, and a sliding pin slidingly disposed within the channel. A first end of the outer ramp member includes a first aperture configured to receive the sliding pin, and a second end of the outer ramp member includes a second aperture configured to receive the fixed pin. The load ramp is configured to be stowed within the cargo area in a stowed position by first securing the first end of the outer ramp member to the sliding pin, sliding the load ramp into the cargo area while the load ramp is supported by the sliding pin sliding along the channel towards a front of the vehicle, and subsequently securing the second end of the outer ramp member to the fixed pin When the load ramp is secured to the utility rail assembly, the inner ramp member is rotatable toward an opposite load ramp and coupleable thereto to establish a divided cargo area having a first cargo area and a second cargo area divided by the inner ramp members of load ramps secured to opposed sidewalls. When the load ramp is secured to the utility rail assembly and the tailgate is in the open position, the inner ramp member is rotatable toward an opposite load ramp and coupleable thereto over the open tailgate to establish an extended cargo area over the open tailgate.

In addition to the foregoing, the described vehicle may include one or more of the following features: two utility rail assemblies disposed on the same sidewall, and a storage container having a first set of apertures to selectively receive the sliding pins of the two utility rail assemblies, and a second set of apertures to selectively receive the fixed pins of the two utility rail assemblies.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 14B is a perspective view of multi-configurable load ramps in another example truck bed extender configuration, according to the principles of the present disclosure;

DESCRIPTION

According to the principles of the present disclosure, a load ramp system for a vehicle is presented. One example application of the load ramp system enables quick and easy storage of load ramps within the truck bed. A sliding mechanism enables sliding movement of the load ramps into and out of the truck bed, and the load ramps are multi-configurable to provide a truck bed divider, a truck bed extender, and a table/workbench.

Figure 1:
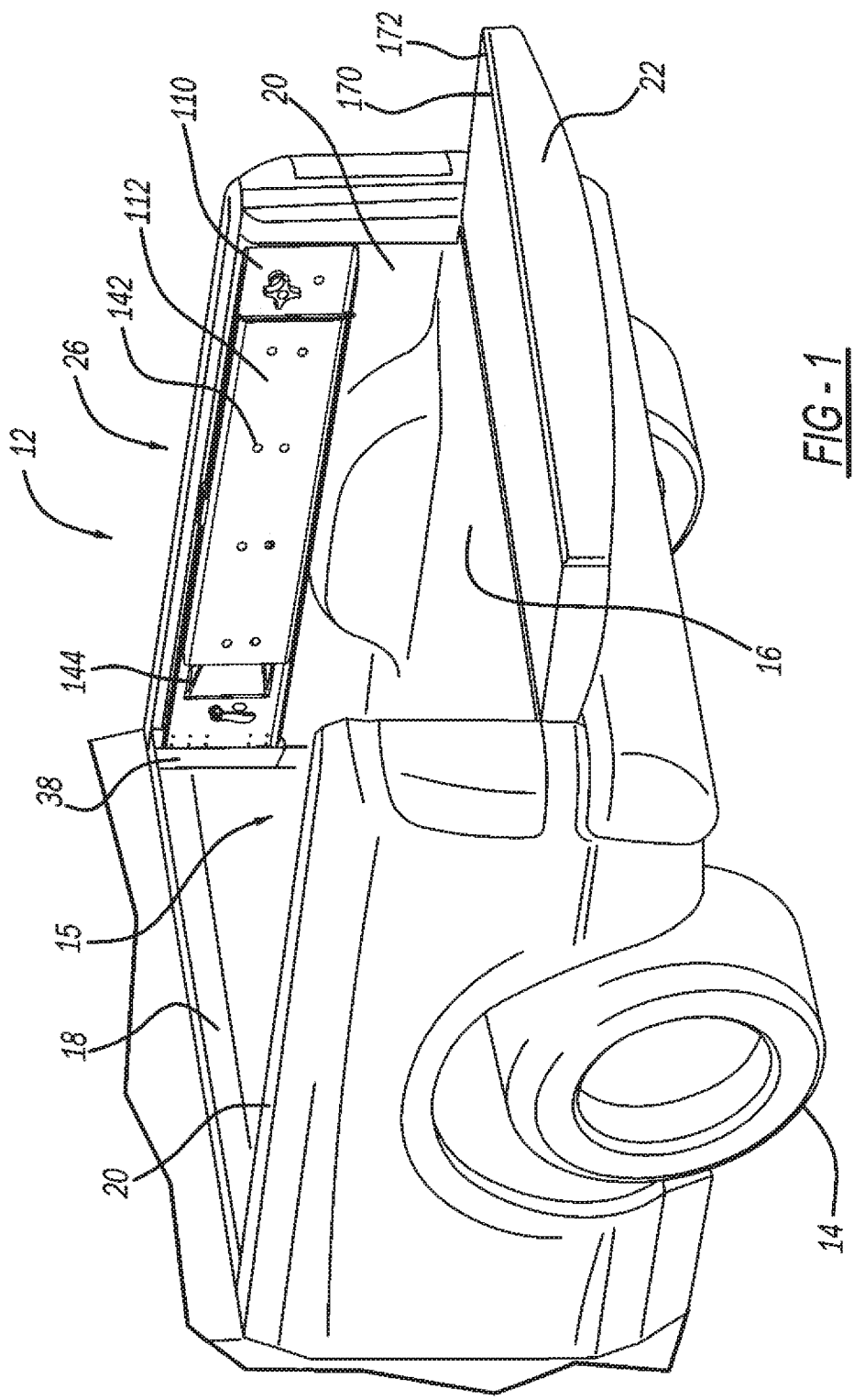
FIG. 1 is a rear perspective view of a vehicle having a storage bed with a tailgate in a closed position and ramp members in a stowed position according to the principles of the present disclosure.

Referring now to FIG. 1, a rear perspective view of a vehicle 10 is illustrated. The vehicle 10 has a storage bed 12 located above one or more rear wheels 14. In one exemplary implementation, the vehicle 10 is a pickup truck as illustrated. In another exemplary implementation, the vehicle 10 is a vehicle having a cargo area above the rear wheels 14 and a closure member, such as a sport utility vehicle with a rear cargo area and a rear hatch. The storage bed 12 provides a truck bed or cargo area 15 defined at least partially by a floor 16, a forward wall 18, sidewalls 20, and a tailgate 22 (shown in an open position).

In the example embodiment, the storage bed 12 includes a utility rail assembly 24 coupled to each sidewall 20 and configured to removably receive a load ramp 26. However, it will be appreciated that vehicle 10 may include any suitable number of utility rail assemblies and associated load ramps. As described herein in more detail, each utility rail assembly 24 is configured to removably receive one load ramp 26 for stowing of the load ramp along sidewall 20 above a wheel well 28. Such an arrangement minimizes interference on the cargo space 15 of storage bed 12 (see FIG. 1). Moreover, utility rail assemblies 24 enable multi-positional movement of the load ramps 26 to provide various positions and utility such as, for example, a cargo area divider (FIG. 13) or a cargo area extender (FIG. 14).

Figure 2:
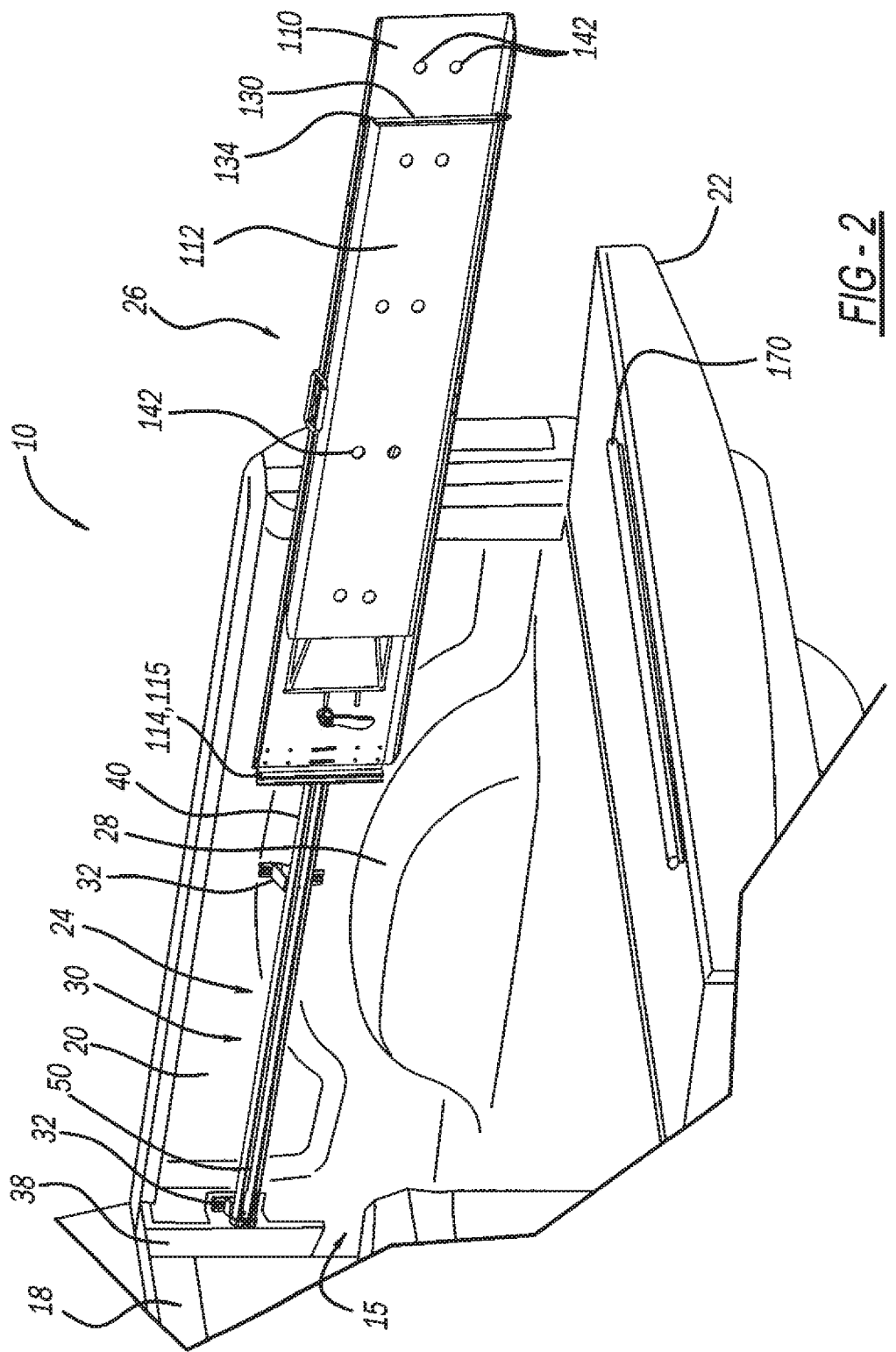
FIG. 2 is a rearward perspective view of the vehicle shown in FIG. 1 with one ramp member shown in an intermediary stowed position according to the principles of the present disclosure.
Figure 3:
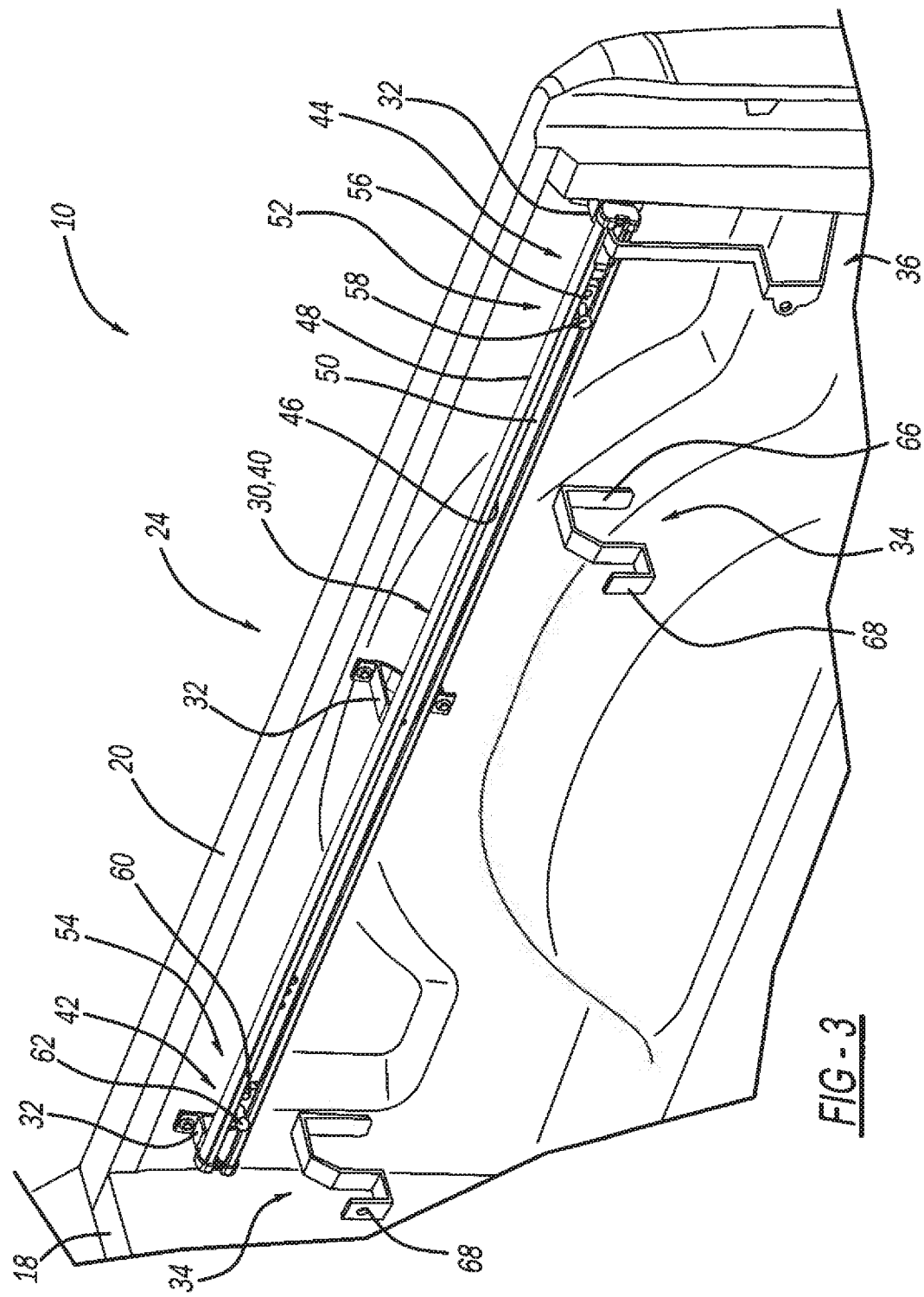
FIG. 3 is a perspective view of one example utility rail assembly according to the principles of the present disclosure.

Referring now to FIGS. 2 and 3, the utility rail assembly 24 will be described in more detail. In the example embodiment, the utility rail assembly 24 generally includes a rail system 30, a plurality of mounting brackets 32, a plurality of ramp support brackets 34, a locking member 36, and a forward stop 38 (FIG. 3).

In the example embodiment, rail system 30 includes a main body 40 having a forward end 42, a rearward end 44, an inboard surface 46, and an outboard surface 48. A channel 50 is formed in the inboard surface 46 and extends from the forward end 42 to the rearward end 44. As shown in FIG. 3, channel 50 includes a fixed pin 52 and a translatable or sliding pin 54. Fixed pin 52 generally includes a base member 56 and a pin member 58. The base member 56 is fixedly coupled to the rail system main body 40 (e.g., via fastener, welding, etc.), and the pin member 58 extends outwardly from the base member 56 and protrudes from the channel 50. Sliding pin 54 generally includes a base member 60 and a pin member 62. The base member 60 is disposed within channel 50, and the pin member 62 extends outwardly from the base member 60 and protrudes from the channel 50. Unlike fixed pin 52 which is fixed to main body 40, sliding pin 54 is configured to slide along channel 50 from the forward end 42 to the fixed pin 52. Although not shown, fixed pin 52 and/or main body 40 may include sliding features (e.g., ball bearings) to assist in sliding movement of fixed pin 52.

As illustrated in FIGS. 2 and 3, the rail system main body 40 is secured to sidewall 20 with mounting brackets 32. More specifically, in the illustrated example, each mounting bracket is coupled to sidewall 20 in at least one location and to main body outboard surface 48 in at least one location. Moreover, three mounting brackets 32 are utilized to secure main body 40 to the sidewall 20 in the illustrated example. However, it will be appreciated that main body 40 can be secured to sidewall with other mounting bracket arrangements and/or any suitable number of mounting brackets.

Figure 4:
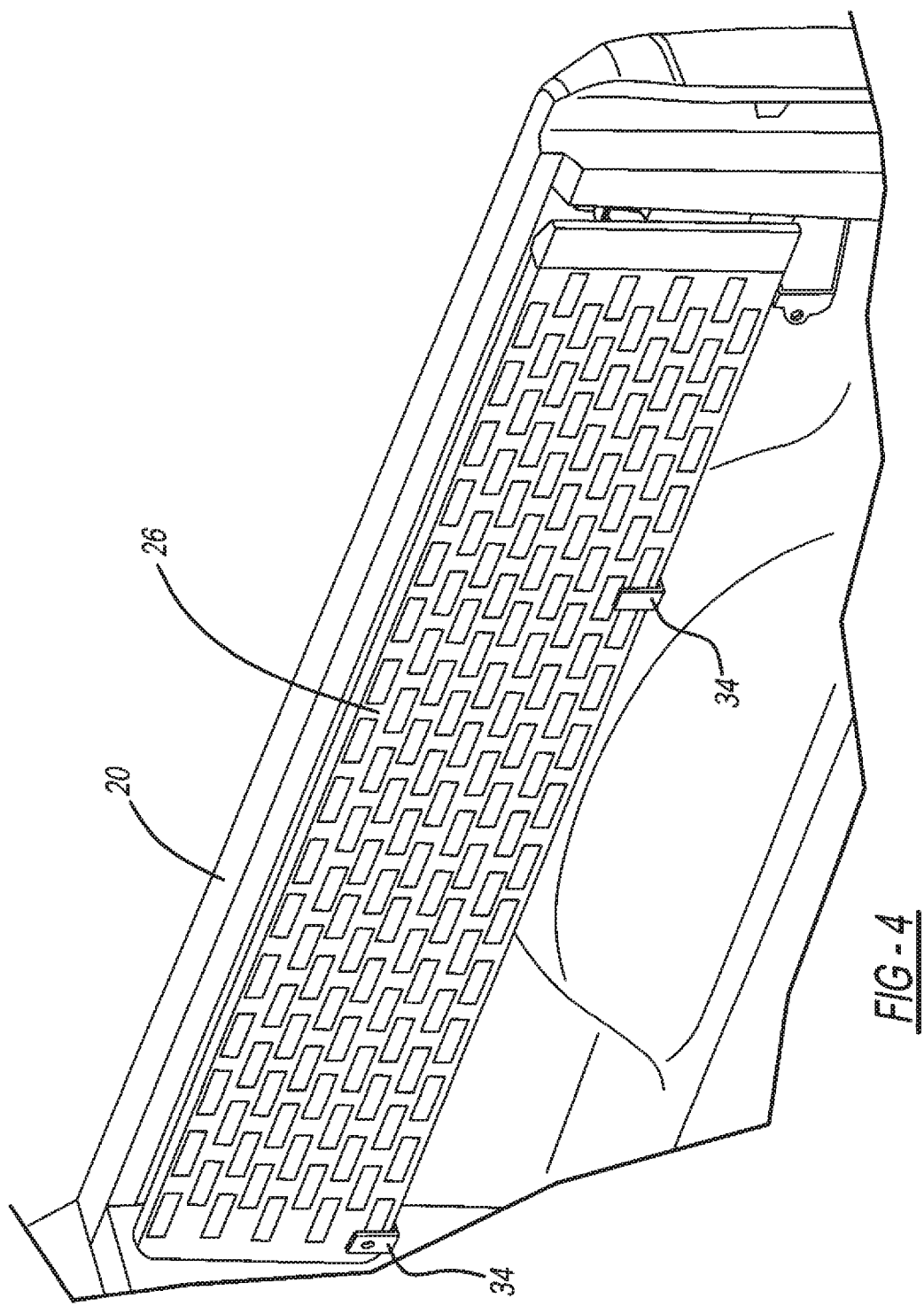
FIG. 4 is a perspective view of the utility rail assembly shown in FIG. 3 with a ramp member in a stowed position according to the principles of the present disclosure.

As illustrated in FIGS. 3 and 4, ramp support brackets 34 are generally S-shaped and include a first end 66 and a second end 68. The ramp support bracket 34 is coupled to sidewall 20 beneath rail system main body 40 to facilitate supporting load ramp 26 when the load ramp is secured to main body 40 (FIG. 4). As shown, first end 66 is coupled to sidewall 20, and second end 68 is generally U-shaped and configured to receive at least a portion of load ramp 26 therein. In the example embodiment, utility rail assembly 24 includes two ramp support brackets 34. However, it will be appreciated that utility rail assembly 24 can have any suitable number of support brackets (e.g., one or three). It will also be appreciated that ramp support brackets 34 may not be utilized, for example as shown in the embodiment of FIGS. 1 and 2.

Figure 5:
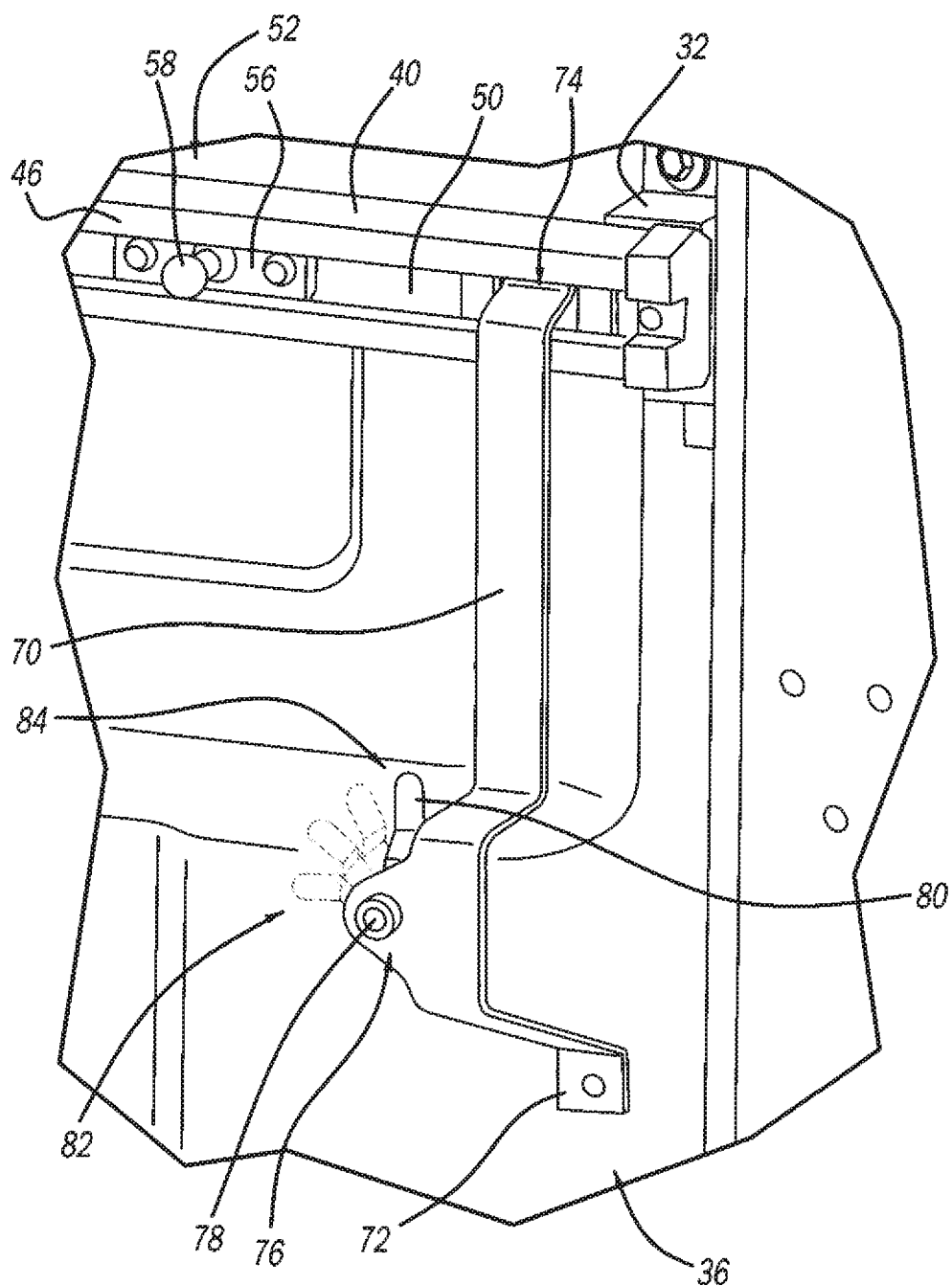
FIG. 5 is a perspective view of one example locking member that may be used with the utility rail assembly of FIG. 3, according to the principles of the present disclosure.

FIGS. 4 and 5 illustrate one example embodiment of locking member 36. In the illustrated example, locking member 36 generally includes a base member 70 having a first end 72 and a second end 74. The first end 72 is coupled to sidewall 20 (e.g., via welding, fastener, etc.), and the second end 74 is inserted into channel 50 and coupled to main body 40 (e.g., via fastener, welding, interference fit, etc.). As shown in FIG. 5, a locking assembly 76 is coupled to base member 70 and includes a lock and tumbler 78 and a locking tab 80. Insertion of a key (not shown) into the lock and tumbler 78 and subsequent rotation rotates locking tab 80 from an unlocked position 82 to a locked position 84 (see FIG. 5). In the locked position, locking tab 80 is configured to secure the load ramp 26 between the locking tab 80 and the base member 70 to facilitate preventing removal of the load ramp 26 from the utility rail assembly 24. It will be appreciated that utility rail assembly 24 may not include locking member 36, for example, as shown in the embodiment of FIGS. 1 and 2.

Figure 6:
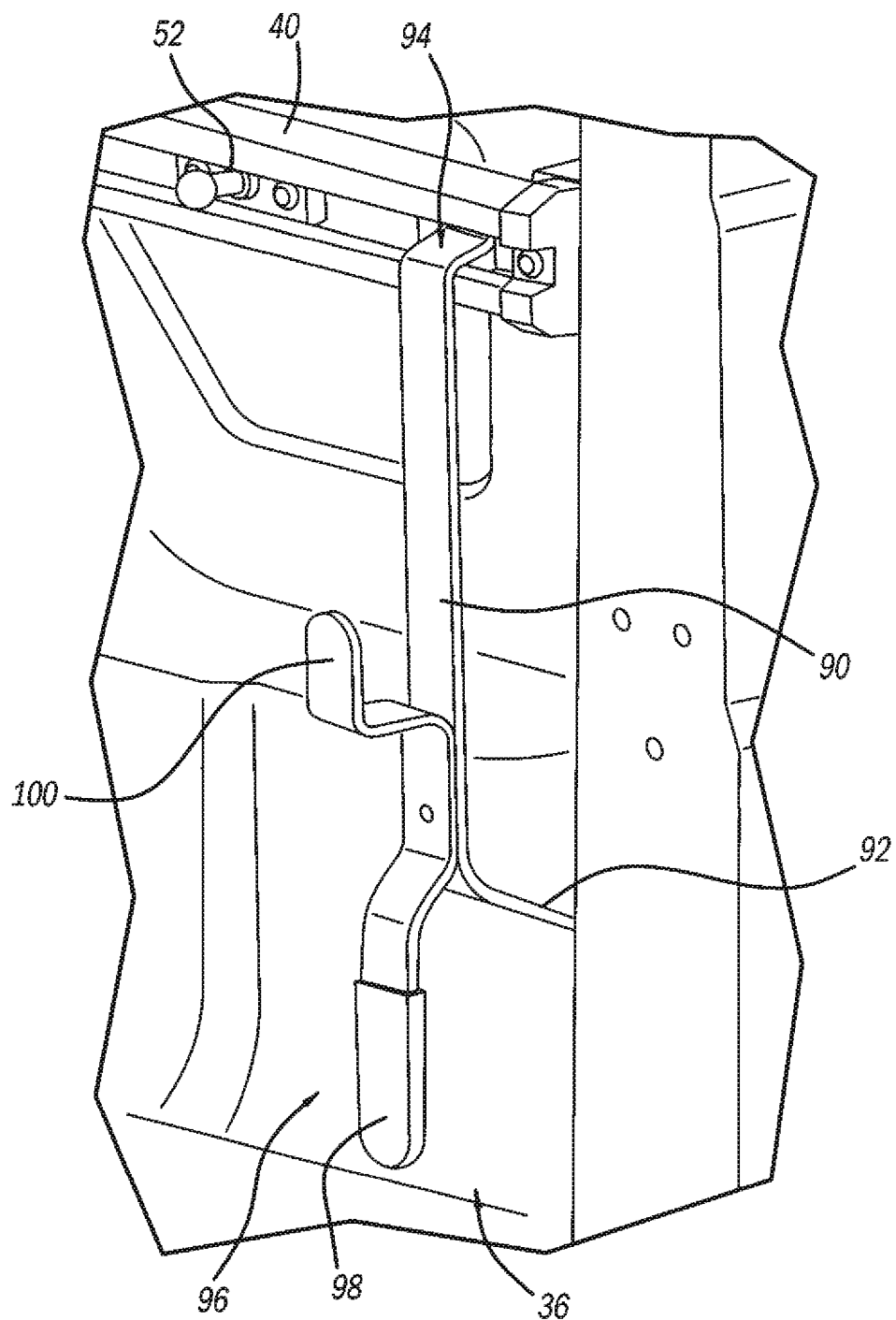
FIG. 6 is a perspective view of another example locking member that may be used with the utility rail assembly of FIG. 3, according to the principles of the present disclosure.

FIG. 6 illustrates an alternative embodiment of locking member 36. In the illustrated example, locking member 36 generally includes a base member 90 having a first end 92 and a second end 94. The first end 92 is coupled to sidewall 20 (e.g., via fastener, welding, etc.), and the second end 74 is inserted into channel 50 and coupled to main body 40 (e.g., via fastener, welding, interference fit, etc.). A locking assembly 96 is pivotably coupled to base member 90 and includes a handle portion 98 and a locking tab 100. Handle portion 98 is utilized to rotate locking tab 100 from an unlocked position (not shown, e.g., rotated 90° counter-clockwise from the position shown in FIG. 6) to a locked position (FIG. 6). In the locked position, locking tab 100 is configured to secure the load ramp 26 between the locking tab 100 and the base member 90 to facilitate preventing removal of the load ramp 26 from the utility rail assembly 24.

Figure 7:
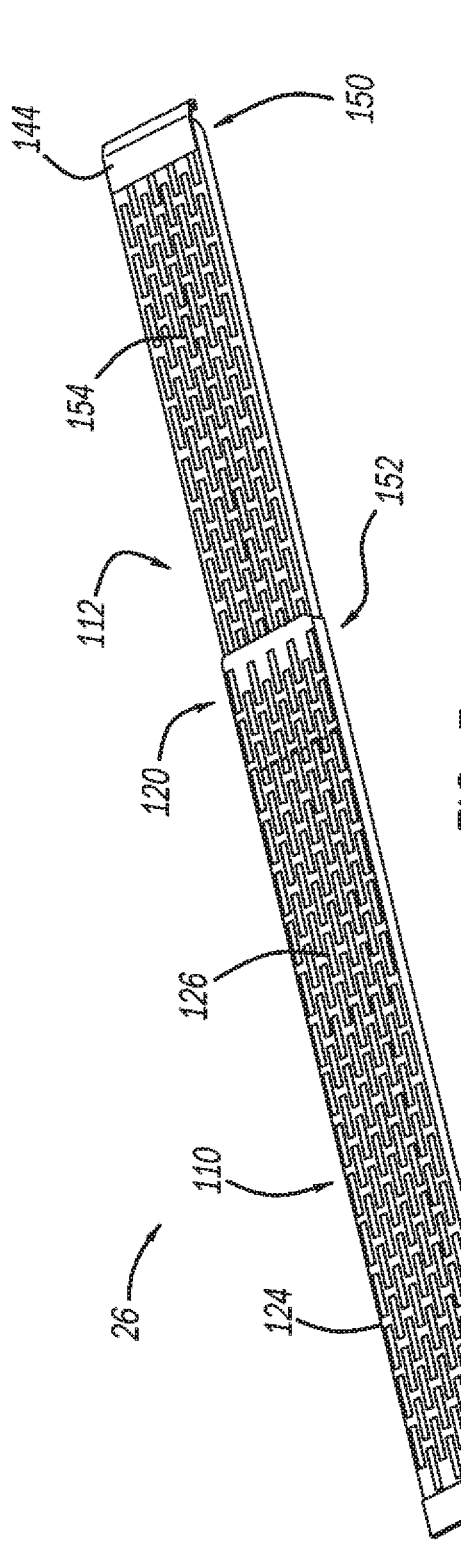
FIG. 7 is a top perspective view of an example load ramp that may be used with the utility rail assemblies shown in FIGS. 1-4, shown in a deployed position according to the principles of the present disclosure.
Figure 8:
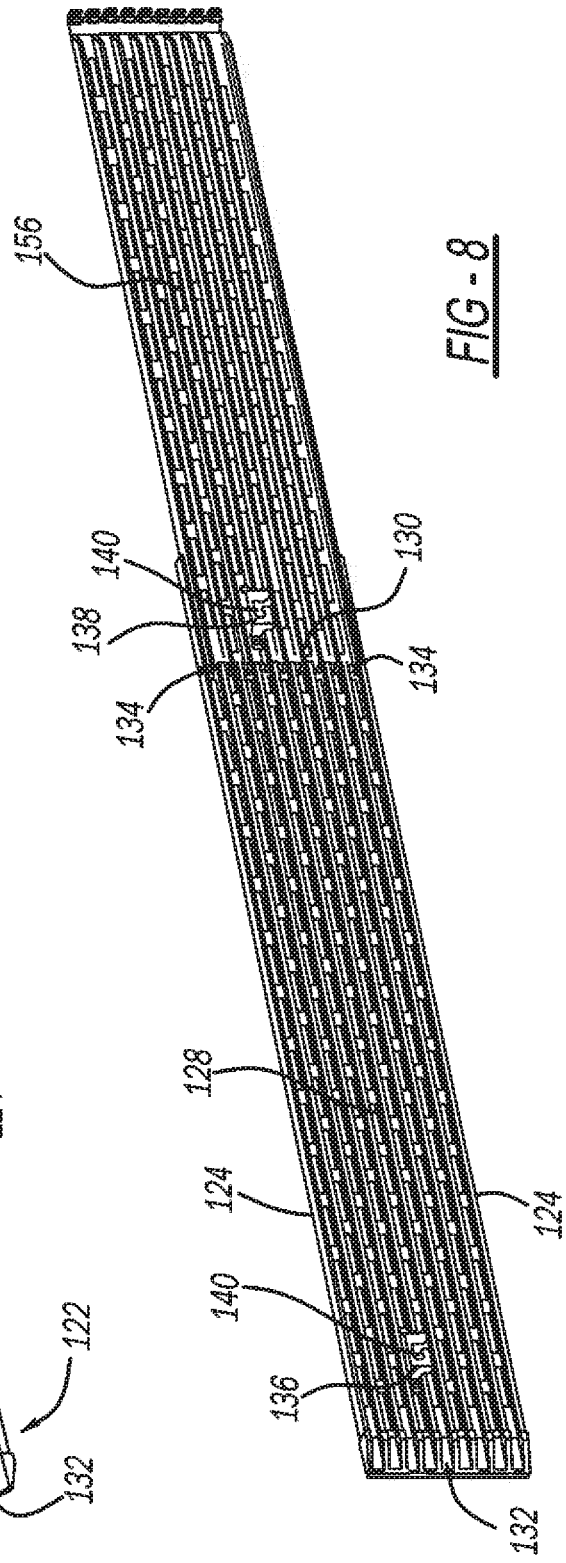
FIG. 8 is a bottom perspective view of the load ramp shown in FIG. 7, according to the principles of the present disclosure.
Figure 9:
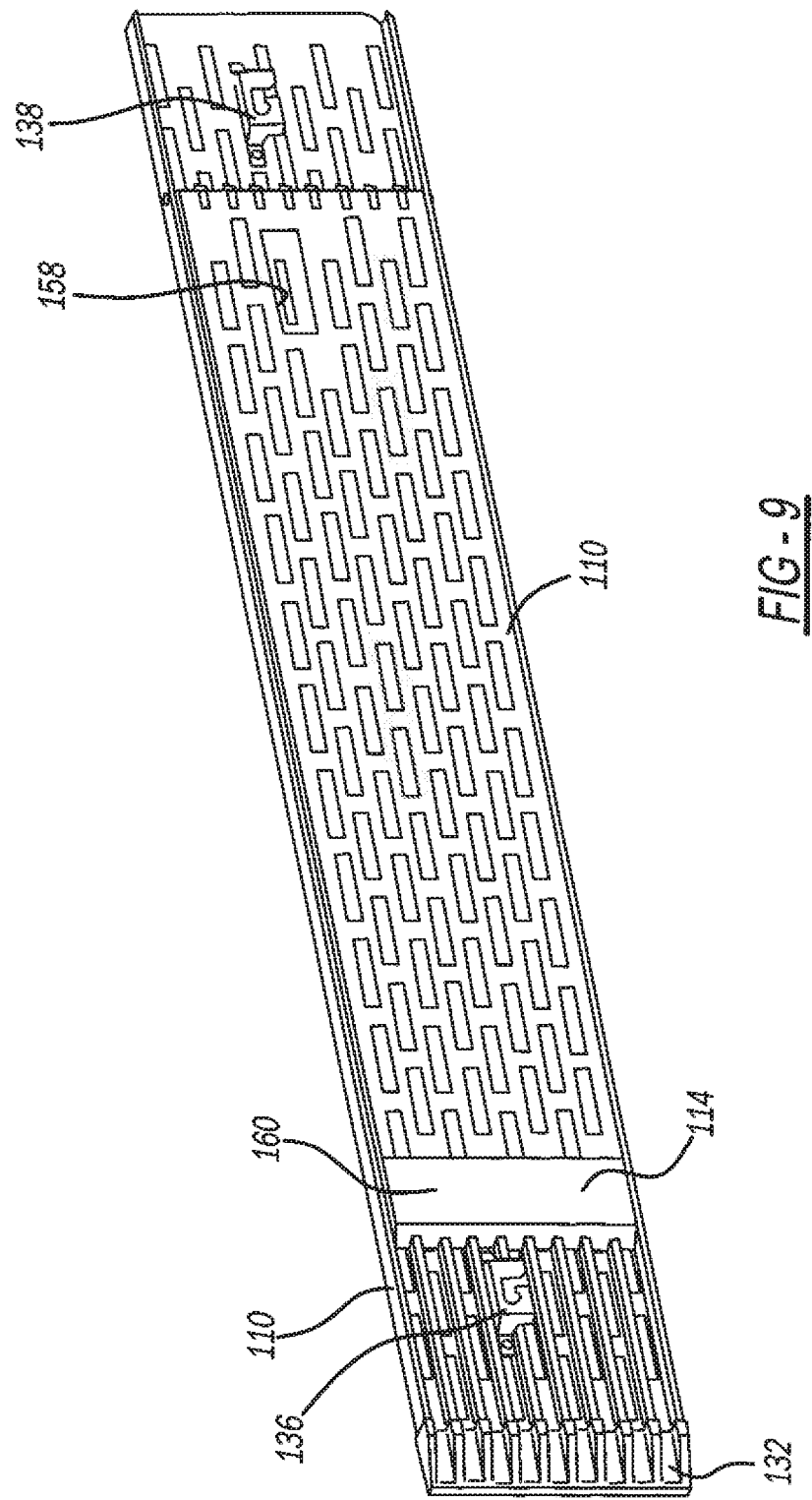
FIG. 9 is a perspective view of the load ramp show in FIG. 7 in a folded position for stowing, according to the principles of the present disclosure.

Referring now to FIGS. 7-9, the load ramps 26 will be described in more detail. In the example embodiment, each load ramp 26 generally includes an outer ramp member 110, an inner ramp member 112, and a vehicle attachment device 114. As described herein in more detail, inner ramp member 112 is rotatably coupled to outer ramp member 110 such that inner ramp member 112 is movable between an extended, deployed position (FIGS. 7 and 8) and a folded, stowed position where inner ramp member 112 is nested within outer ramp member 110 (as shown in FIGS. 1 and 9). The load ramp 26 is configured to be removably secured to tailgate 22 via vehicle attachment device 114, for example, when the tailgate 22 is in an open position.

In the example embodiment, outer ramp member 110 generally includes a forward end 120, a rearward end 122, sides 124, a top surface 126, and a bottom surface 128. The forward end 120 is configured to rotatably couple to inner ramp member 112 via a hinge member 130 extending between sides 124 (see FIG. 8). The rearward end 122 includes a ground adapter 132 configured to be selectively placed on the ground when load ramp 26 is utilized to load/unload cargo from cargo area 15. Sides 124 define edges or lips having a depth that enables inner ramp member 112 to nest within outer ramp member 110 without extending beyond sides 124. Additionally, each side 124 includes an aperture 134 to receive hinge member 130 at least partially therethrough. However, it will be appreciated that inner ramp member 112 can be pivotably or rotatably coupled to inner ramp member 112 in any suitable manner that enables load ramp 26 to function as described herein.

Figure 15:
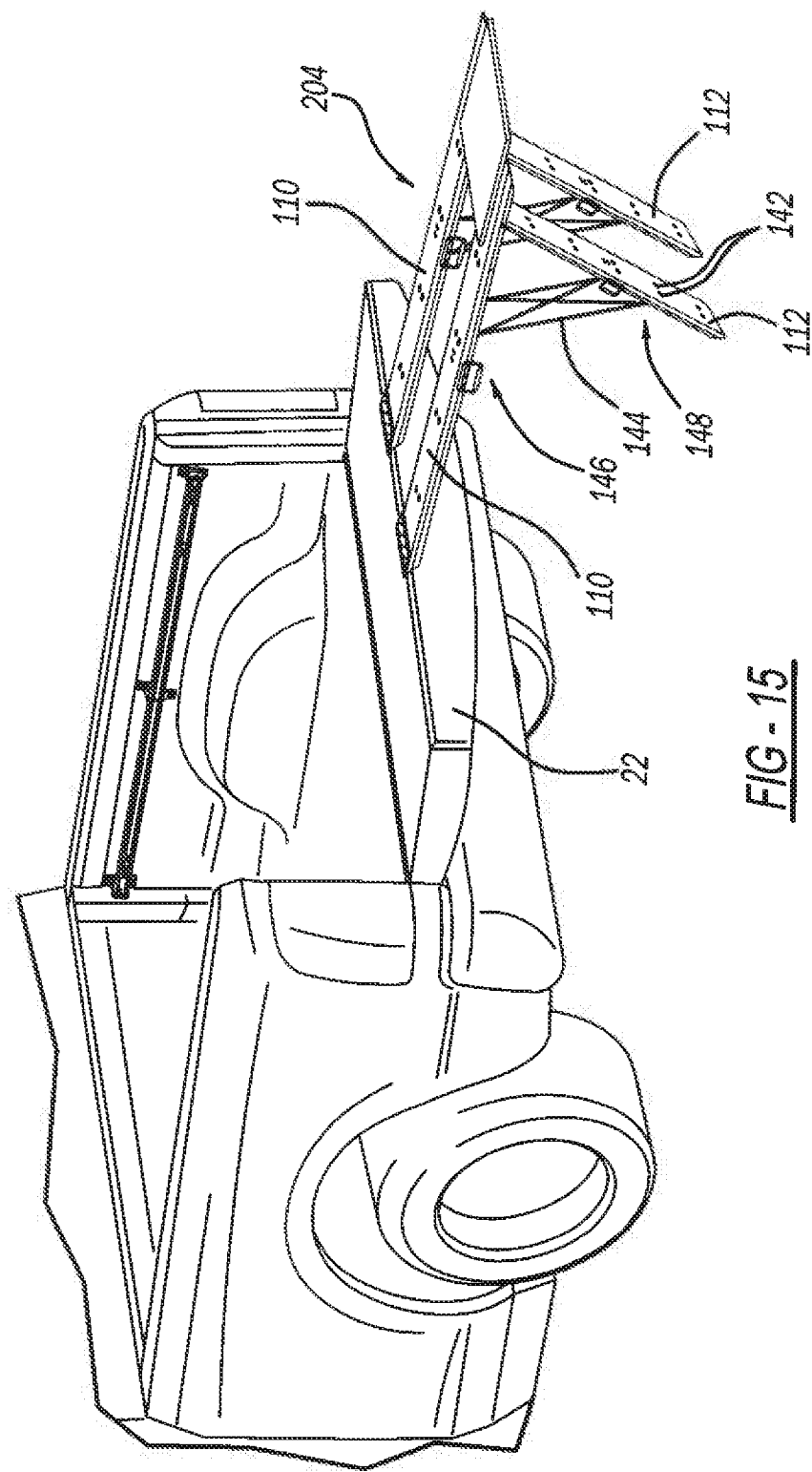
FIG. 15 is a perspective view of load ramps in an example tabletop configuration, according to the principles of the present disclosure.
Figure 16:
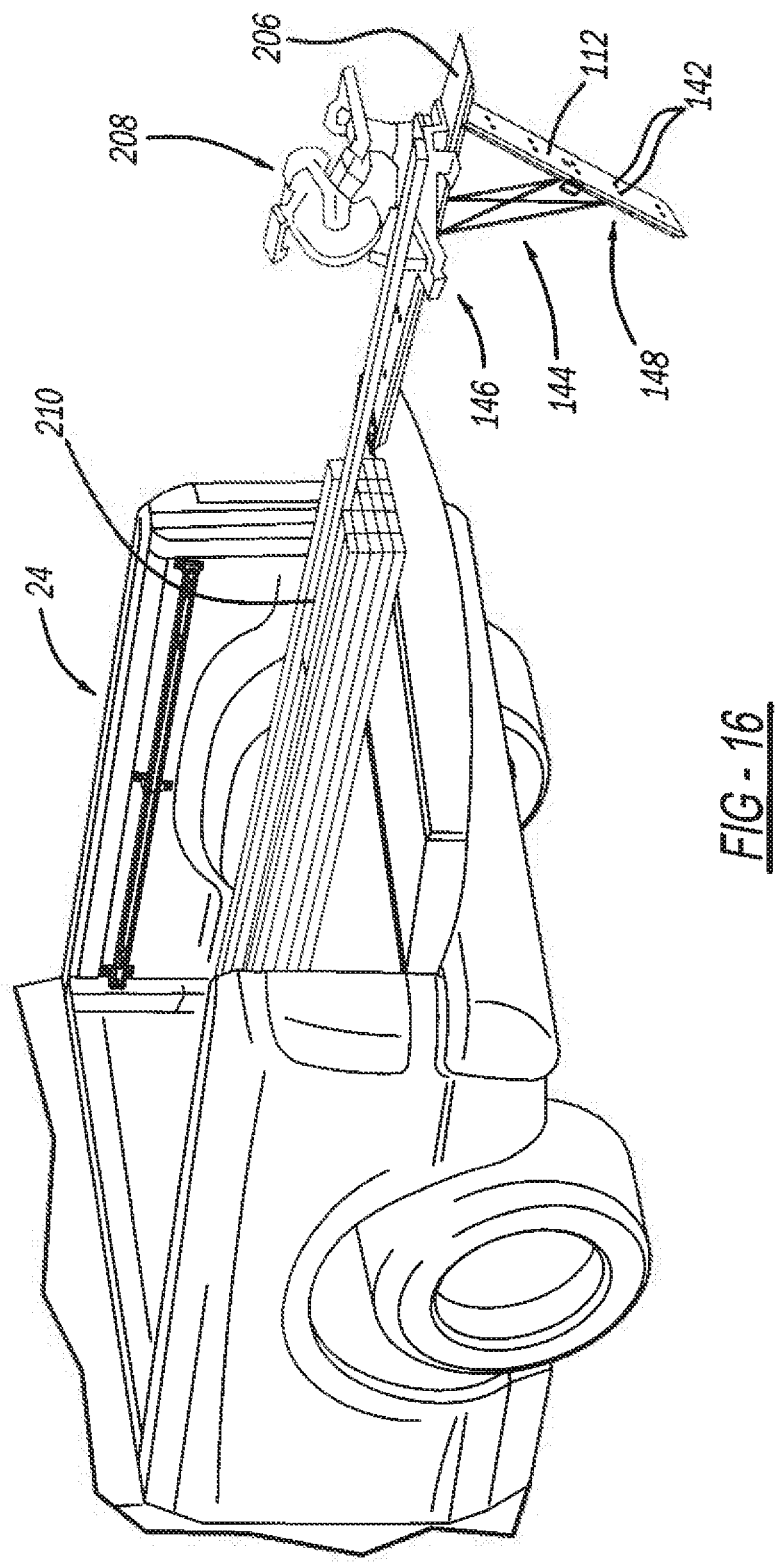
FIG. 16 is a perspective view of load ramps in an example work surface configuration, according to the principles of the present disclosure.

In the example embodiment, top surface 126 is configured to provide a working surface such as for walking, rolling a smaller vehicle (e.g., ATV), or receiving a power tool (see FIG. 16). As shown in FIGS. 8 and 9, first and second brackets 136, 138 are coupled to bottom surface 128. Brackets 136, 138 each define a receiving slot 140 configured to receive one of the fixed pin 52 and the sliding pin 54 to thereby hangingly couple load ramp 26 to utility rail assembly 24. However, it will be appreciated that load ramps 26 may not include brackets 136, 138 and may instead include one or more apertures 142 (e.g., FIG. 2) configured to receives pins 52, 54. Additionally, in some embodiments, a brace or support arm 144 (e.g., see FIG. 2) is pivotably coupled to bottom surface 128 at one end 146 and the other end 148 is configured to selectively engage or couple with inner ramp member 112 (e.g., via apertures 142) to establish a desired orientation between outer ramp member 110 and inner ramp member 112 (e.g., see FIGS. 15 and 16).

In the example embodiment, inner ramp member 112 generally includes a forward end 150, a rearward end 152, a top surface 154, and a bottom surface 156. The forward end 150 is coupled to vehicle attachment device 114, and rearward end 152 is rotatably coupled to outer ramp member 110 via hinge member 130. An aperture or window 158 is formed in the inner ramp member 112 to provide clearance for and to receive bracket 138 when inner ramp member 112 is folded into outer ramp member 110.

Figure 10:
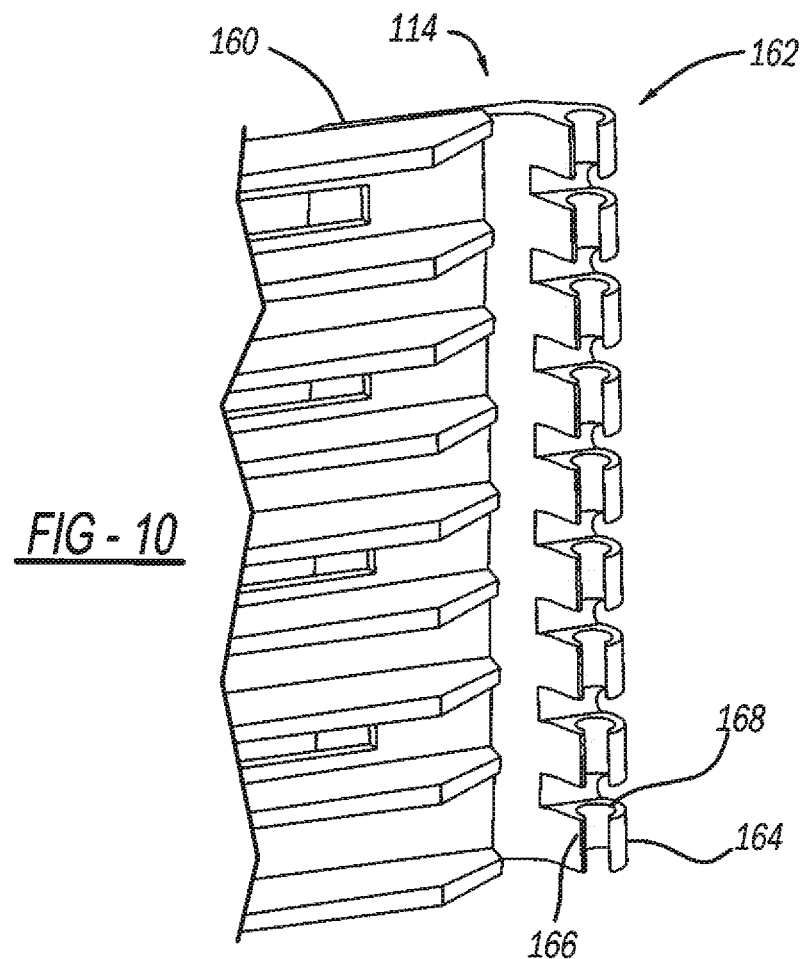
FIG. 10 is a bottom perspective view of one example vehicle attachment device for the load ramp shown in FIG. 7, according to the principles of the present disclosure.

With additional reference to FIGS. 9 and 10, the vehicle attachment device 114 will be described in more detail. In the illustrated embodiment, device 114 generally includes a plate member 160 and a plurality of hook members 162 extending therefrom. Plate member 160 is generally planar and is coupled to inner ramp member top surface 154 at forward end 150. As shown in FIG. 10, hook members 162 extend outwardly from plate member 160 beyond the termination of forward end 150. Hook members 162 generally includes an upper jaw 164 and a lower jaw 166 arranged in a generally crescent shape to define a receiving slot 168, which is configured to receive a rail 170 (e.g., see FIG. 2). In the example embodiment, rail 170 is coupled to an upper inner surface 172 of tailgate 22 such that rail 170 extends generally cross-car and is accessible when the tailgate 22 is in the open position. As such, load ramp 26 is configured to couple to tailgate 22 via the vehicle attachment device 114 and rail 170 (e.g., see FIG. 15).

Figure 11:
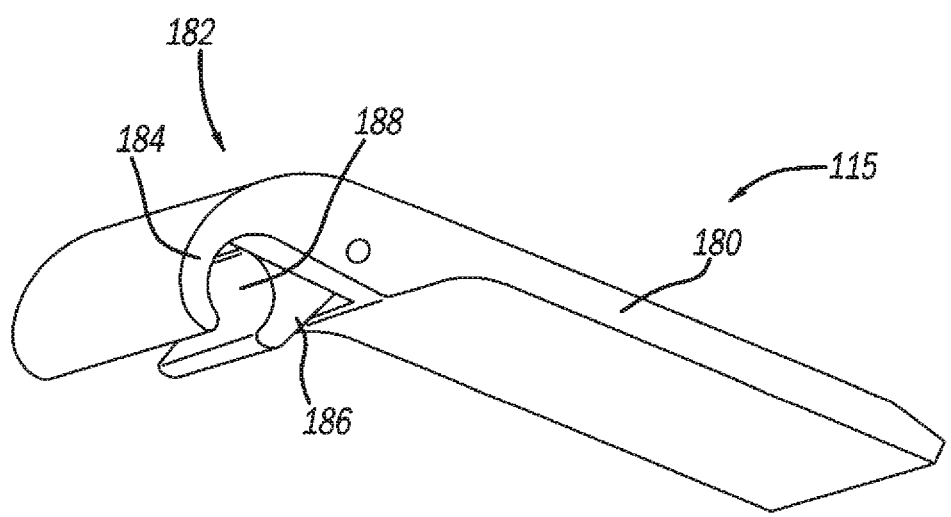
FIG. 11 is a perspective view of another example vehicle attachment device for the load ramp shown in FIG. 7, according to the principles of the present disclosure.

FIGS. 10 and 11 illustrate another example embodiment of vehicle attachment device identified at 115 that is similar to device 114 except vehicle attachment device 115 includes a movable jaw to selectively provide a positive clamping force on rail 170. In the illustrated embodiment, device 115 generally includes a plate member 180 and a hook member 182 extending therefrom. Plate member 180 is generally planar and is coupled to inner ramp member top surface 154 at forward end 150. Hook member 182 extends outwardly from plate member 180 beyond the termination of forward end 150 and generally includes a upper jaw 184 and a lower jaw 186 arranged in a generally crescent shape to define a receiving slot 188, which is also configured to receive rail 170. However, the lower jaw 186 differs from lower jaw 166 in that lower jaw 186 is pivotally coupled to upper jaw 184 and includes an inner end 190 and an opposite outer end 192.

Figure 12:
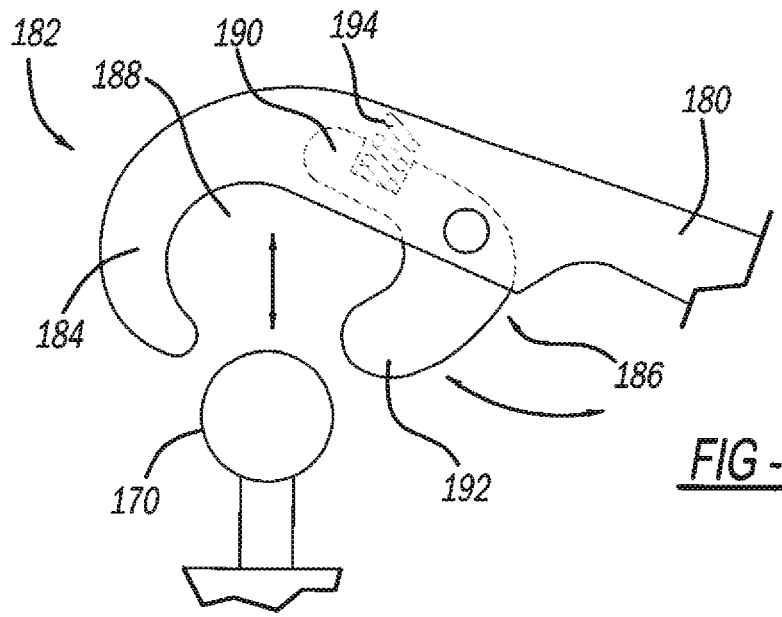
FIG. 12 is a side view of the vehicle attachment device shown in FIG. 11, according to the principles of the present disclosure.

In the example embodiment, a biasing member 194 (e.g., a spring) is configured to bias jaw inner end 190 at least partially into receiving slot 188 such that jaw outer end 192 is moved away from upper jaw 184 (i.e., biased counterclockwise as shown in FIG. 12). When vehicle attachment device 115 is placed onto rail 170, the rail 170 is received in the receiving slot 188 and contacts jaw inner end 190, thereby overcoming the biasing force of biasing mechanism 194 and rotating lower jaw 186 clockwise (as shown in FIG. 12) such that jaw outer end 192 provides a clamping force around rail 170. As such, rail 170 is positively secured within receiving slot 188. Upward movement of the vehicle attachment device 115 away from rail 170 subsequently causes rail 170 to contact jaw outer 192 and, along with biasing mechanism 194, causes rotation of lower jaw 186 and release of rail 170.

In operation, in order to stow load ramp 26, inner ramp member 112 is rotated into the nested position within outer ramp member 110. Sliding pin 54 is moved along channel 50 until it is next to or proximate fixed pin 52 at the vehicle rear. Outer ramp member forward end 120 is moved toward utility rail assembly 24 such that sliding pin 54 is received within bracket 138 (or aperture 142). The user can then push load ramp 26 into the cargo area 15 toward the front of the vehicle, which causes sliding pin 54 to slide toward the vehicle front while supporting and guiding the load ramp 26 into forward ramp support bracket 34. Forward stop 38 receives outer ramp member forward end 120 and prevents further motion thereof toward the vehicle front. Outer ramp member rearward end 122 is then moved toward utility rail assembly 24, into rearward ramp support bracket 34, and bracket 136 (aperture 142) is secured over fixed pin 52. Locking member 36 may then be manipulated to secure load ramp 26 in its stowed position, for example as shown in FIGS. 1 and 4. As noted, if brackets 34 and 136,138 are not included, load ramp apertures 142 are utilized to receive fixed and sliding pins 52, 54. The process is reversed in order to unload and deploy load ramp 26.

Figure 13:
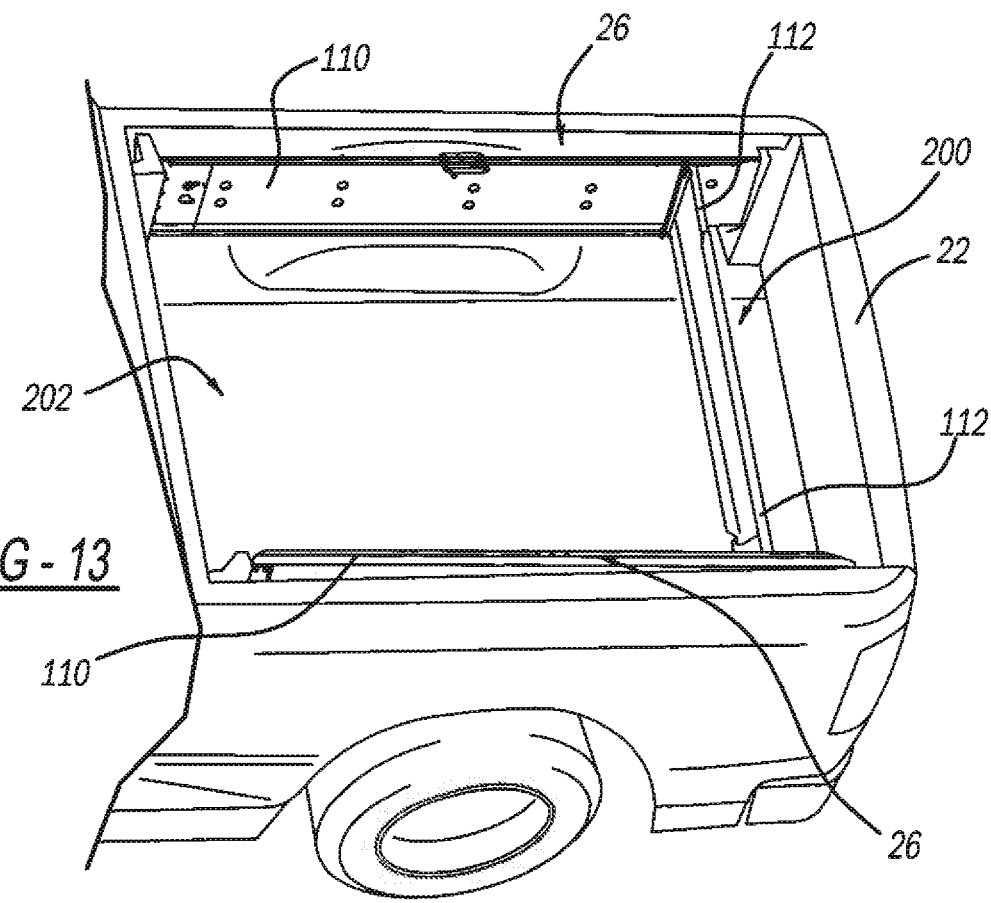
FIG. 13 is a perspective view of multi-configurable load ramps in an example truck bed divider configuration, according to the principles of the present disclosure.
Figure 14A:
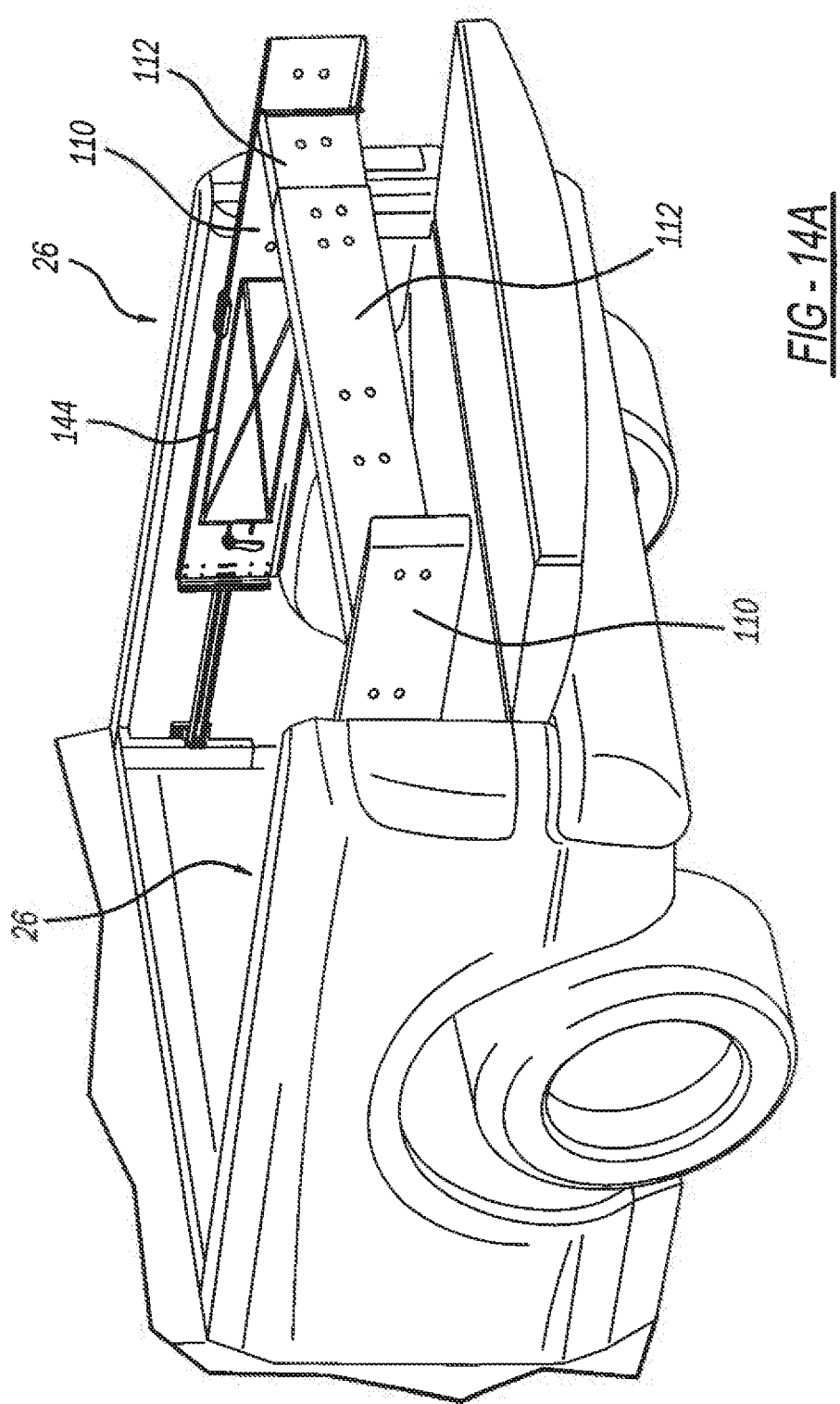
FIG. 14A is a perspective view of multi-configurable load ramps in an example truck bed extender configuration, according to the principles of the present disclosure.

As shown in FIGS. 13-16, load ramp(s) 26 is/are multi-configurable to provide various user utilities. For example, FIG. 13 illustrates load ramps 26 in a bed divider configuration, FIGS. 14A and 14B illustrate load ramps 26 in a bed extender configuration, FIG. 15 illustrates load ramps 26 in a tabletop configuration, and FIG. 16 illustrates load ramp 26 in a work surface configuration. Each configuration will be now be described in more detail.

FIG. 13 illustrates load ramps 26 in a bed divider configuration that divides cargo area 15 into a first or rearward cargo area 200 and a second or forward cargo area 202. As shown, load ramps 26 are secured to the opposed sidewalls 20 (via rail assembly 24) and inner ramp members 112 are rotated outward toward each other to a position perpendicular or substantially perpendicular to outer ramp members 110. In such an arrangement, one inner ramp member 112 has a smaller width than the other inner ramp member 112 so as to be nestingly received within the larger width inner ramp member 112. The inner ramp members 112 may then be secured to each other, for example, by a locking pin or fastener (not shown).

FIG. 14A illustrates load ramps 26 in a bed extender configuration which enables the cargo area 15 to extend out over an open tailgate 22. As shown, tailgate 22 is moved to the open position and load ramps 26 are secured to opposed sidewalls 20 (via rail assembly 24). The load ramps 26 are slid toward the vehicle rear on a partial length of the utility rail assembly 24, and the inner ramp members 112 are rotated outward toward each other to a position perpendicular or substantially perpendicular to outer ramp members 110. In such an arrangement, one inner ramp member 112 has a smaller width than the other inner ramp member 112 so as to be nestingly received within the larger width inner ramp member 112. The inner ramp members 112 may then be secured to each other, for example, by a locking pin or fastener (not shown). In such an arrangement outer ramp members 110 may include an additional bracket (e.g., 136 or aperture 142) to enable coupling with fixed pin 52.

In alternative embodiments, outer ramp member 110 and/or inner ramp member 112 may be further segmented and rotatably coupled to enable outer ramp member 110 and/or inner ramp member 112 to be configured in non-orthogonal positions (e.g., inner ramp members 112 are disposed toward each other at an angle between 0° and 60° relative to their associated outer ramp member 110). For example, in one embodiment shown in FIG. 14B, a second inner ramp member 113 is rotatably coupled to inner ramp member 112a via a hinge member 131. Second inner ramp member 113 has a narrower width than inner ramp member 112a such that second inner ramp member is configured to be nestingly received within inner ramp member 112a in a similar manner to inner ramp member 112 being received within outer ramp member 110. In the example embodiment, second inner ramp member 113 is releasably secured to inner ramp member 112b via a fastener 196. In the example illustration, inner ramp members 112a, 112b are disposed at an angle 'α' relative to their associated outer ramp member 110. In some embodiments, angle 'α' is between approximately 30° and approximately 45° or between 30° and 45°.

FIG. 15 illustrates load ramps 26 in a tabletop configuration that enables the load ramps 26 to provide a tabletop surface 204 (e.g., like a picnic table). In the example operation, load ramps 26 are coupled to tailgate 22 via the vehicle attachment device 114, 115. Inner ramp members 112 are rotated toward the ground until outer ramp members 110 are parallel to or substantially parallel to the ground. The support arm 144 of each load ramp 26 is rotated into secured contact with inner and outer ramp members 112, 110 (e.g., by inserting support arm free end 148 into aperture(s) 142) to secure the relative positioning therebetween.

FIG. 16 illustrates load ramp 26 in a work surface configuration that provides a worktop surface 206 configured to receive a tool 208 (e.g., saw) and/or work material 210 (e.g., wood). In the example operation, load ramps 26 are coupled to tailgate 22 via the vehicle attachment device 114, 115. Inner ramp members 112 are rotated toward the ground until outer ramp members 110 are parallel to or substantially parallel to the ground. The support arm 144 of each load ramp 26 is rotated into secured contact with inner and outer ramp members 112, 110 to secure the relative positioning therebetween. In such a position, outer ramp member 110 defines the worktop surface 206 to receive tool 208 and/or work material 210. Although not shown, outer ramp member 110 may additionally include locking features to secure tool 208 thereto.

Figure 17:
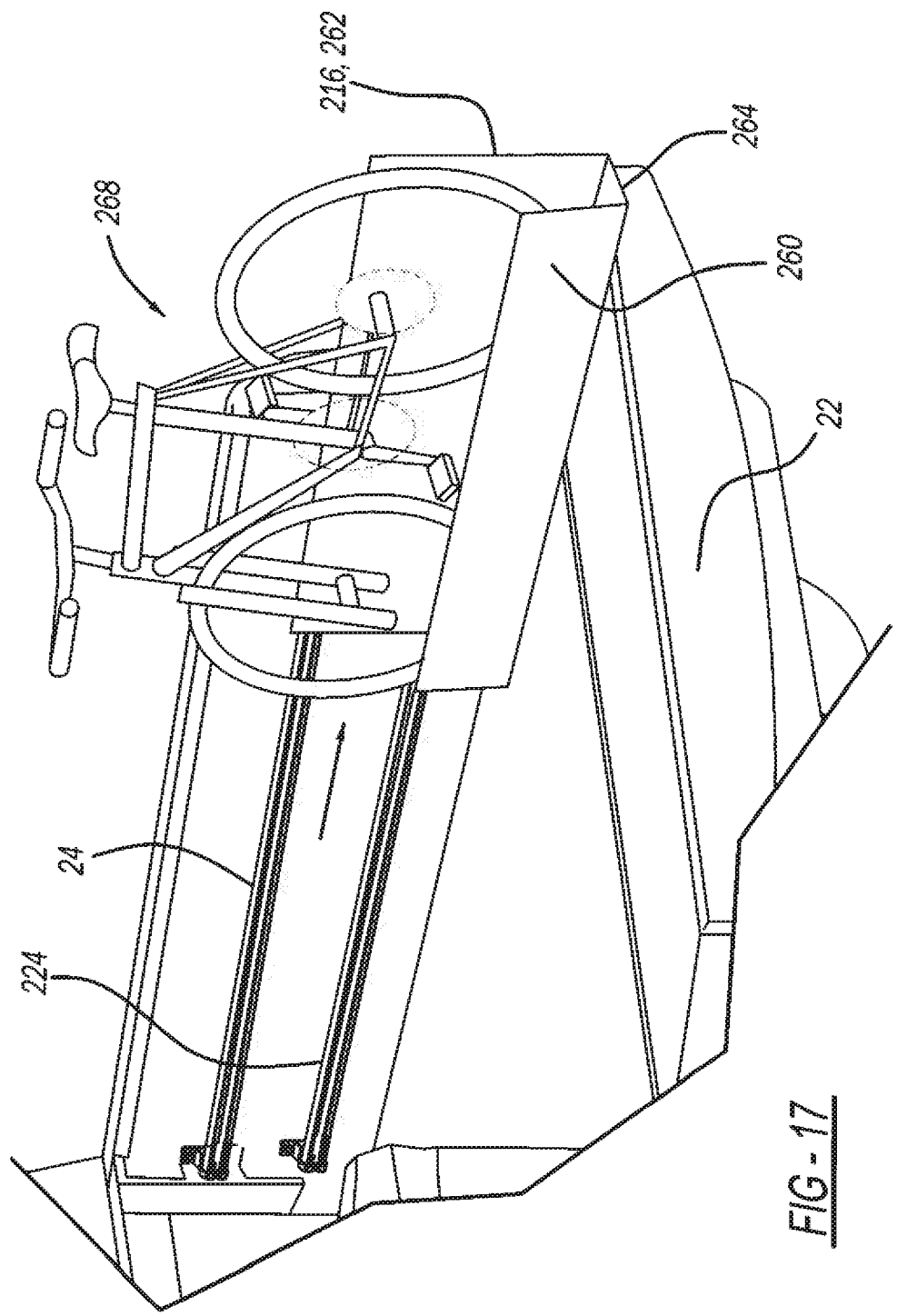
FIG. 17 is a perspective view of an example utility rail assembly and associated open storage container, according to the principles of the present disclosure.
Figure 18:
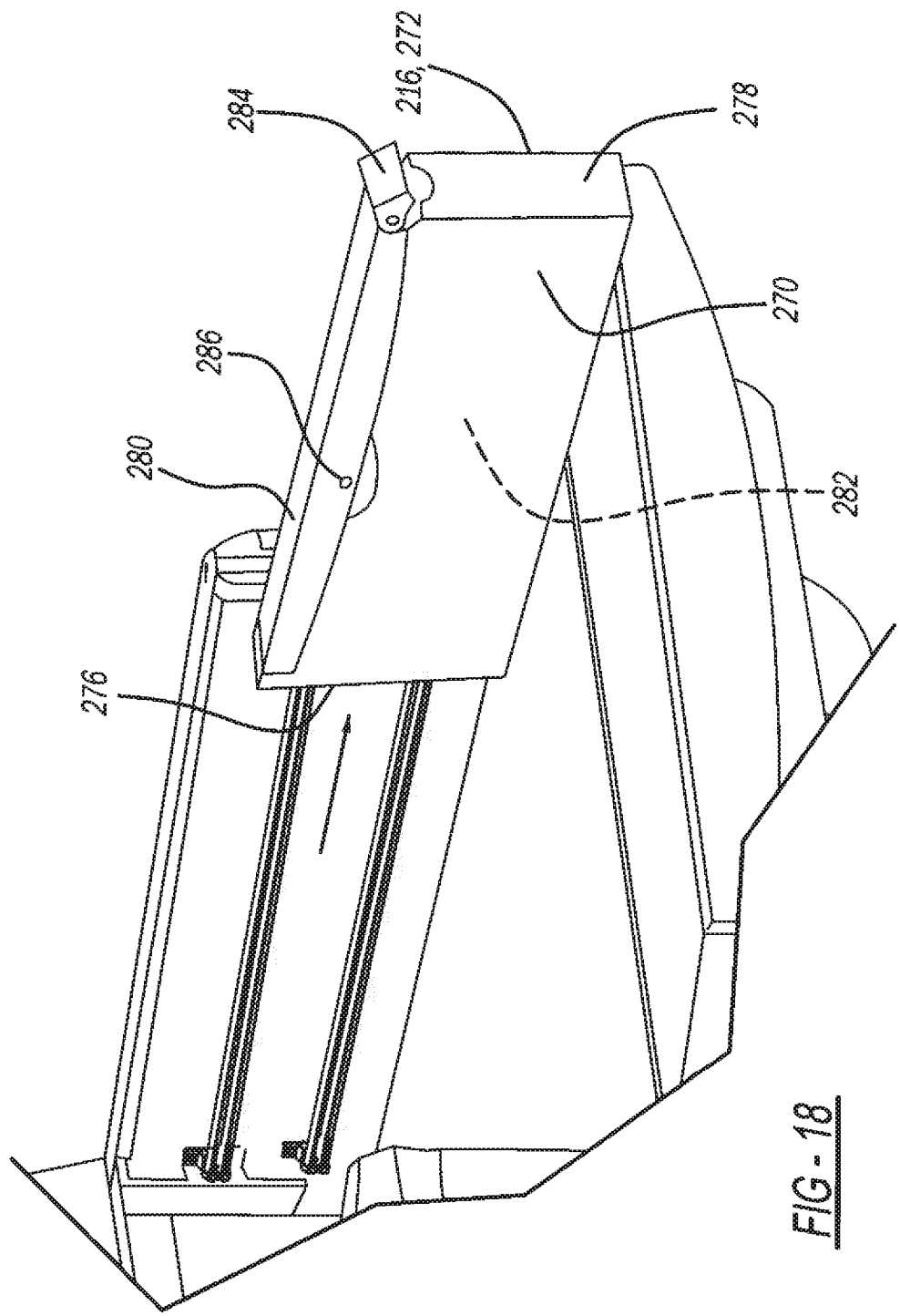
FIG. 18 is a perspective view of an example utility rail assembly and associated closed storage container, according to the principles of the present disclosure.

FIGS. 17 and 18 illustrate another example embodiment of a utility rail assembly identified at 224 that is similar to utility rail assembly 24 except utility rail assembly 224 includes a second rail system main body 240 in addition to main body 40. In the example embodiment, utility rail assembly 224 can have any features or components of utility rail assembly 24, and utility rail assembly 224 can operate and function in a manner similar to utility rail assembly 24. However, in addition to being configured to receive load ramps 26, utility rail assembly 224 is configured to receive an open storage container 212 (FIG. 17) and an enclosed storage container 214 (FIG. 18). Both storage containers 212, 214 include a surface 216 having a set of first brackets (not shown; e.g., two brackets 136) or apertures (not shown; e.g., two apertures 142) to each receive one of the fixed pins 52 of the main bodies 40, 240, and a set of second brackets (not shown; e.g., two brackets 138) or apertures (e.g., two apertures 142) to each receive one of the sliding pins 54 of the main bodies 40, 240.

As shown in the illustrated embodiment of FIG. 17, open storage container 212 generally includes a low sidewall 260 coupled to a high sidewall 262 by a bottom wall 264. Open storage container 212 defines a receiving channel 266 configured to receive an object such as, for example, a bicycle 268. Although not shown, open storage container 212 may include one or more fasteners or devices configured to secure the object therein. As such, open storage container 212 is configured to receive large or hard to handle objects and enable quick and easy loading thereof into and out of the vehicle cargo area 15 via the utility rail assemblies 24, 224.

As shown in the illustrated embodiment of FIG. 18, closed storage container 214 generally includes sidewalls 270, 272 connected by a bottom wall 274, a forward wall 276, and a rearward wall 278. In the illustrated example, a top 280 is rotatably coupled to at least one of forward wall 276, sidewall 270, and sidewall 272 to form an enclosure 282 when moved from an open position to a closed position (shown in FIG. 18). In one example, a rotatable handle 284 is configured to move from a locked position preventing opening of the top 280, and an unlocked position that enables opening of the top 280 for loading/unloading items into the enclosure 282. In addition, top 280 can include a lock assembly 286 configured to selectively lock the top 280 to sidewall 270, for example, via a key and lock and tumbler (not shown). As such, closed storage container 214 is configured to receive objects and enable quick and easy loading thereof into and out of the vehicle cargo area 15 via the utility rail assemblies 24, 224.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A multi-configurable load ramp for a vehicle having a tailgate at least partially defining a cargo area, comprising:
   an outer ramp member;
   an inner ramp member pivotably coupled to the outer ramp member and movable between a deployed position extending from the outer ramp member, and a folded position where the inner ramp member is disposed nestingly within outer ramp member;
   a vehicle attachment device coupled to one of the inner and outer ramp members, the vehicle attachment device configured to removably couple to the tailgate when in an open position, wherein the vehicle attachment device includes a plate member and a hook member extending therefrom, the hook member having an upper jaw and a lower jaw at least partially defining a receiving slot to receive a portion of the tailgate,
wherein in the deployed position, one of the inner and outer ramp members is configured to couple to the tailgate via the vehicle attachment device to provide a ramp surface to load and/or unload objects from a cargo area of the vehicle,
wherein the lower jaw is pivotally coupled to the upper jaw; and
a biasing mechanism configured to bias the lower jaw away from the upper jaw into an open, unclamped position such that an inner end of the lower jaw is disposed in the receiving slot, wherein when the portion of the tailgate enters the receiving slot, the tailgate portion contacts the inner end and pivots the lower jaw toward the upper jaw such that an outer end of the lower jaw is configured to clamp around the tailgate portion disposed within the receiving slot.

2. The load ramp of claim 1, further comprising a support arm having a first end pivotably coupled to one of the outer ramp member and the inner ramp member and configured to have an opposite second end selectively engage the other of the outer ramp member and the inner ramp member to secure a relative positioning between the inner ramp member and the outer ramp member in a triangular support structure.

3. The load ramp of claim 2, wherein in a first position the load ramp is coupled to the tailgate and the inner ramp member is secured relative to the outer ramp member with the support arm such that the load ramp is in a tabletop position that provides a tabletop surface, and wherein in a second position the load ramp is coupled to the tailgate and the inner ramp member is secured relative to the outer ramp member with the support arm such that the load ramp is in a work surface position that provides a work surface to receive at least one of a power tool and a work material.

4. A multi-configurable load ramp for a vehicle having a tailgate at least partially defining a cargo area, comprising:
an outer ramp member;
an inner ramp member pivotably coupled to the outer ramp member and movable between a deployed position extending from the outer ramp member, and a folded position where the inner ramp member is disposed nestingly within outer ramp member; and
a vehicle attachment device coupled to one of the inner and outer ramp members, the vehicle attachment device configured to removably couple to the tailgate when in an open position, wherein the vehicle attachment device includes a plate member and a hook member extending therefrom, the hook member having an upper jaw and a lower jaw at least partially defining a receiving slot to receive a portion of the tailgate,
wherein in the deployed position, one of the inner and outer ramp members is configured to couple to the tailgate via the vehicle attachment device to provide a ramp surface to load and/or unload objects from a cargo area of the vehicle, and
wherein the load ramp is configured to couple to a wall in the cargo area and the inner ramp member is rotatable toward an opposite load ramp and coupleable thereto to establish a divided cargo area having a first cargo area and a second cargo area divided by the inner ramp member and the opposite load ramp.

5. The load ramp of claim 4, wherein the load ramp is configured to couple to a wall in the cargo area and the inner ramp member is rotatable toward an opposite load ramp and coupleable thereto over the tailgate in an open position to establish an extended cargo area over the open tailgate.

6. A vehicle comprising:
a cargo area defined at least partially by a pair of opposed sidewalls and a tailgate movable between a closed position and an open position,
a rail coupled to the tailgate and extending in a generally cross-vehicle direction;
a pair of load ramps each comprising:
an outer ramp member;
an inner ramp member pivotably coupled to the outer ramp member and movable between a deployed position extending from the outer ramp member, and a folded position where the inner ramp member is nestingly received within outer ramp member;
a vehicle attachment device coupled to the outer ramp member and configured to receive the rail to thereby couple the load ramp to the tailgate, the vehicle attachment device including a plate member and a hook member extending therefrom, the hook member having an upper jaw and a lower jaw at least partially defining a receiving slot to receive the rail; and
a support arm pivotably coupled to one of the outer ramp member and the inner ramp member and configured to selectively engage the other of the outer ramp member and the inner ramp member to secure a relative positioning between the inner ramp member and the outer ramp member, wherein in a first position the load ramp is coupled to the tailgate and the inner ramp member is secured relative to the outer ramp member with the support arm such that the load ramp is in a tabletop position that provides a tabletop surface, and wherein in a second position the load ramp is coupled to the tailgate and the inner ramp member is secured relative to the outer ramp member with the support arm such that the load ramp is in a work surface position that provides a work surface to receive at least one of a power tool and a work material; and
utility rail assemblies coupled to the opposed sidewalls, each utility rail assembly comprising a rail system having a main body defining a channel, a fixed pin disposed in one end of the channel, and a sliding pin slidingly disposed within the channel, wherein a first end of the outer ramp member includes a first aperture configured to receive the sliding pin, and a second end of the outer ramp member includes a second aperture configured to receive the fixed pin,
wherein the load ramp is configured to be stowed within the cargo area in a stowed position by first securing the first end of the outer ramp member to the sliding pin, sliding the load ramp into the cargo area while the load ramp is supported by the sliding pin sliding along the channel towards a front of the vehicle, and subsequently securing the second end of the outer ramp member to the fixed pin,
wherein when the load ramp is secured to the utility rail assembly, the inner ramp member is rotatable toward an opposite load ramp and coupleable thereto to establish a divided cargo area having a first cargo area and a second cargo area divided by the inner ramp members of load ramps secured to opposed sidewalls, and
wherein when the load ramp is secured to the utility rail assembly and the tailgate is in the open position, the inner ramp member is rotatable toward an opposite load ramp and coupleable thereto over the open tailgate to establish an extended cargo area over the open tailgate.

7. The vehicle of claim 6, wherein the lower jaw is pivotally coupled to the upper jaw and is biased to an open, unclamped position by a biasing mechanism such that an inner end of the lower jaw is disposed in the receiving slot, wherein when the rail enters the receiving slot, the rail contacts the inner end and pivots the lower jaw toward the upper jaw such that an outer end of the lower jaw is configured to clamp around the rail disposed within the receiving slot.

8. The vehicle of claim 6, further comprising:
two utility rail assemblies disposed on the same sidewall; and
a storage container having a first set of apertures to selectively receive the sliding pins of the two utility rail assemblies, and a second set of apertures to selectively receive the fixed pins of the two utility rail assemblies.

* * * * *